(12) United States Patent
Stotkiewitz et al.

(10) Patent No.: US 8,887,766 B2
(45) Date of Patent: Nov. 18, 2014

(54) PRESSURE RELIEF VALVE FOR A PACKAGING CONTAINER

(75) Inventors: Herbert Stotkiewitz, Bietigheim-Bissingen (DE); Juergen Haak, Weert (NL)

(73) Assignee: Robert Bosch GmbH, Stuttgart (DE)

( * ) Notice: Subject to any disclaimer, the term of this patent is extended or adjusted under 35 U.S.C. 154(b) by 148 days.

(21) Appl. No.: 13/512,462

(22) PCT Filed: Oct. 19, 2010

(86) PCT No.: PCT/EP2010/065685
§ 371 (c)(1),
(2), (4) Date: Aug. 8, 2012

(87) PCT Pub. No.: WO2011/064051
PCT Pub. Date: Jun. 3, 2011

(65) Prior Publication Data
US 2012/0292319 A1 Nov. 22, 2012

(30) Foreign Application Priority Data
Nov. 26, 2009 (DE) .......................... 10 2009 047 170

(51) Int. Cl.
*F16K 15/14* (2006.01)
*B65D 77/22* (2006.01)

(52) U.S. Cl.
CPC .................................. *B65D 77/225* (2013.01)
USPC ..................... 137/852; 220/89.1; 220/203.11; 383/103

(58) Field of Classification Search
USPC ........... 137/852; 220/203.11, 203.15, 203.16, 220/203.18, 89.1; 493/213; 383/103
See application file for complete search history.

(56) References Cited

U.S. PATENT DOCUMENTS

| 5,263,777 A | 11/1993 | Domke |
| 5,727,881 A | 3/1998 | Domke |
| 7,244,223 B2 * | 7/2007 | Hartman et al. .............. 493/213 |
| 2006/0006176 A1 | 1/2006 | Stotkiewitz et al. |

FOREIGN PATENT DOCUMENTS

| CN | 1420066 | 5/2003 |
| DE | 4435492 | 4/1996 |
| WO | 2007113097 | 10/2007 |

OTHER PUBLICATIONS

PCT/EP2010/065685 International Search Report dated Feb. 23, 2011 (Translation and Original, 10 pages).

* cited by examiner

*Primary Examiner* — Kevin Lee
*Assistant Examiner* — Phyllis Nichols
(74) *Attorney, Agent, or Firm* — Michael Best & Friedrich LLP

(57) ABSTRACT

The invention relates to a pressure relief valve (2) for a packaging container (1), comprising a base plate (3), which can be fastened on a wall of the packaging container and has a valve opening (9), also comprising a membrane (4), which is arranged on the base plate (3) over the valve opening (9), wherein the membrane (4) has an adhesive on one side, and further comprising an intermediate layer (6), which is adhesively bonded to the adhesive-containing side of the membrane such that the membrane (4) has two remaining, parallel adhesive-containing peripheral zones for fastening on the base plate (3), wherein the membrane (4) is arranged on the base plate by way of the intermediate layer (6) such that a channel zone (14) is formed on the base plate (3), this channel zone covering over the valve opening (9) and resting right up against the base plate in the closed position.

17 Claims, 6 Drawing Sheets

PRESSURE RELIEF VALVE FOR A PACKAGING CONTAINER

BACKGROUND OF THE INVENTION

The present invention relates to a pressure relief valve for a packaging container.

Oxygen-sensitive goods, like, for example, coffee, are packaged in tightly sealed packaging containers in order to prevent spoilage due to oxygen. Because freshly roasted coffee does however produce carbon dioxide, increased pressure would then build up, which swells and eventually bursts the package. It is therefore known to provide the packaging container with pressure relief valves. A pressure relief valve, which comprises a base plate having a valve opening and a membrane over said valve opening, is known, for example, from the European Parliament patent publication EP 0 760 790 B1. The valve opening is thereby configured from two intersecting, annular openings. This pressure relief valve has basically proven to be successful, has however relatively large dimensions. For that reason, the pressure relief valves from prior art have to almost always be arranged on a front face. Front faces of this kind are however used as presentation surfaces and therefore undesirable restrictions result, for example with regard to the printing on the packaging, by mounting the pressure relief valve on the front face. The known pressure relief valve is furthermore relatively complex to produce because the base plate has to be partially wetted with adhesive and the membrane then affixed to the base plate. In so doing, a wrinkling can quickly occur, whereby the pressure relief valve is no longer leak-proof.

SUMMARY OF THE INVENTION

The inventive pressure relief valve has in contrast the advantage that it can be very easily and cost effectively manufactured and particularly can be manufactured with reduced dimensions. Besides a desirable material savings, the big advantage ensuing therefrom is that the pressure relief valve according to the invention can be arranged at any desired position on the packaging container. For example, the inventive pressure relief valve can now also be arranged on narrow or back sides or along the longitudinal seam of the packaging. According to the invention, this is achieved as a result of the pressure relief valve having a base plate comprising a valve opening, a membrane and an intermediate layer. The membrane comprises one side, on which an adhesive coating has been completely applied, and the intermediate layer is bonded to the membrane by means of the adhesive coating such that said membrane comprises two parallel peripheral zones for fastening on the base plate. In other words, the adhesive coating of the membrane serves on the one hand to affix the intermediate layer and on the other hand to fasten the membrane on the base plate. In so doing, the membrane is adhesively bonded to the base plate by way of the intermediate layer such that a channel zone is formed, which provides an outlet channel through the valve opening when a positive pressure exists in the interior of the packaging container, and the membrane rests right up against the base plate in the closed position. According to the invention, the membrane can therefore simply be completely coated on one side with an adhesive and a bonding of the membrane to the base plate can be prevented by the intermediate layer which is affixed to said membrane. In addition, a simple modular construction can thereby be achieved because by means of a simple variation of the thickness of the intermediate layer, an opening pressure, whereat the pressure relief valve opens, can be set. As a result, no further dimensions of the pressure relief valve have to be changed, but merely another intermediate layer having a different thickness has to be affixed.

It is particularly preferred for the intermediate layer to be adhesively bonded to the center of the membrane. A symmetrical construction and even opening characteristics of the pressure relief valve result thereby as well as two equally large peripheral zones for fastening on the base plate. It is particularly preferred for the intermediate layer to have a larger thickness than the membrane. In so doing, a stiffening effect of the intermediate layer on the membrane can be achieved.

It is further preferred for a ratio of a surface area of the intermediate layer to a surface area of the valve opening to be selected such that the equation 3#V#4 is satisfied, wherein V is preferably approximately 3.5. By adjusting this amount, it has surprisingly been shown that excellent sealing and opening properties of the pressure relief valve can be provided independently of an absolute size of the valve opening or the channel zone.

The valve opening in the base plate has preferably a surface area, which is less than 30 mm$^2$ and more preferably less than 25 mm$^2$. This ensures a very small overall dimension of the pressure relief valve.

The base plate has preferably a surface area, which is less than 250 mm$^2$, more preferably less than 160 mm$^2$. It can thereby be ensured that the pressure relief valve can be mounted at any desirable position on the packaging container.

The invention furthermore relates to a pressure relief valve comprising a base plate which has a valve opening and a membrane and can be mounted on a wall of the packaging container. The membrane is arranged on the base plate over the valve opening and fastened on the base plate by means of two parallel peripheral zones such that a channel zone is formed on said base plate which defines an outlet path when a positive pressure occurs and rests right up against the membrane in the closed position. A ratio of a surface area of the channel zone to a surface area of the valve opening is thereby selected such that the equation 3#V#4 is satisfied, wherein the ratio of the surface areas of the channel zone to the valve opening is preferably approximately 3.5. By adhering to these dimensions of the surface areas of the channel zone to the surface area of the valve opening, a reliable opening of the pressure relief valve can be ensured for every pressure range. It was furthermore surprisingly determined that a significant reduction in the dimensions of the pressure relief valve is possible when there is adherence to these dimensions. The adherence to these dimensions further ensures that favorable lever ratios are achieved between the membrane and the valve opening, whereby the vacuum resistance is also increased. Because of this fact, it is possible for the first time for the inventive pressure relief valve to also fulfill the requirements of the can industry for containers.

The valve opening is especially preferably formed by two intersecting circular surfaces, preferably having the same radius. A simple geometric construction is thereby achieved, wherein two inwardly directed cavity apexes result at the valve opening.

A longitudinal extension of the valve opening equal to one half of a length of the base plate is further preferred. The opening properties of the pressure relief valve can thereby be even more improved.

According to a further preferred embodiment of the invention, the valve opening formed by three or four or six intersecting circular sections. As a result, three cavity apexes ensue from three intersecting circular surfaces, four cavity apexes from four intersecting circular surfaces and six cavity apexes from six intersecting circular surfaces. The intersecting circular surfaces are preferably arranged such that symmetrical forms result.

A particularly good opening property results if the cavity apexes preferably have a triangular shape.

The pressure relief valve preferably further comprises a spacer, which ensures that the membrane can arch if a positive pressure occurs in the packaging container. The positive pressure can thus be let out of the packaging container.

BRIEF DESCRIPTION OF THE DRAWINGS

Preferred exemplary embodiments of the invention are described below in detail with reference to the accompanying drawings. In the drawings.

DETAILED DESCRIPTION

A pressure relief valve 2 according to a first exemplary embodiment of the invention is described below in detail with reference to the FIGS. 1 to 3.

Figure 2:
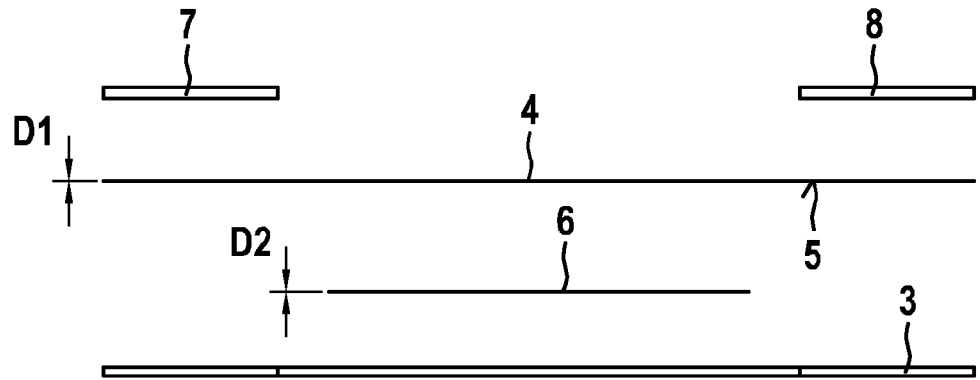
FIG. 2 shows an exploded view of the pressure relief valve of the first exemplary embodiment.
Figure 3:
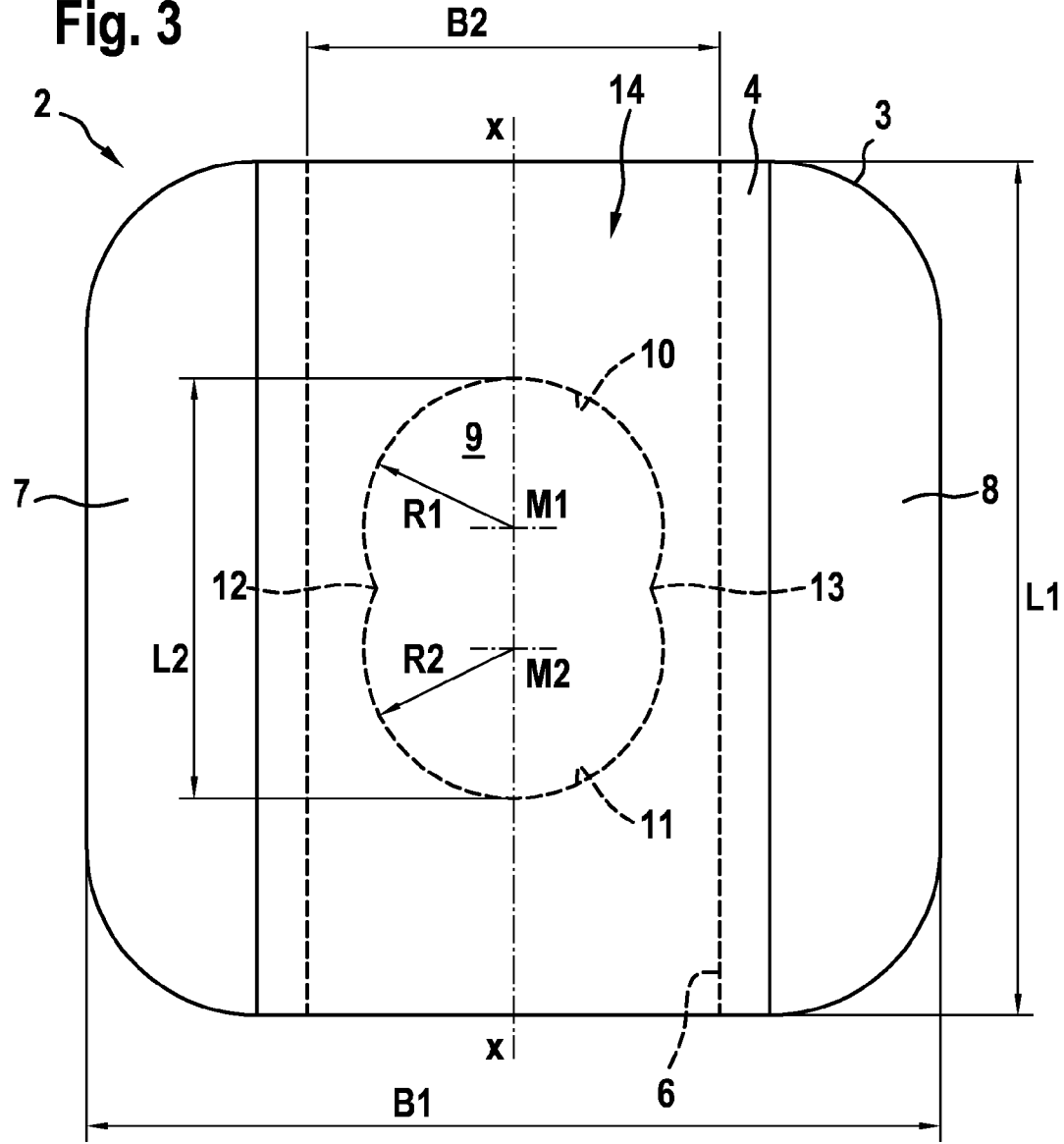
FIG. 3 shows a top view of the pressure relief valve of the first exemplary embodiment.

As can be seen in FIGS. 2 and 3, the pressure relief valve 2 comprises a base plate 3, in which a valve opening 9 is centrally arranged. The base plate 3 has a square shape with rounded corners. The pressure relief valve further comprises a membrane 4, an intermediate layer 6 and a first and a second spacer 7, 8. An adhesive coating 5 is applied to one side of the membrane 4 and covers the entire side thereof. The external shape of said membrane 4 thereby corresponds to the external shape of the base plate 3. The intermediate layer 6 is adhesively bonded to the adhesive-containing side of said membrane 4.

Two peripheral zones result thereby, which are parallel to one another and with which said membrane is adhesively bonded to the base plate 3. In so doing, the intermediate layer 6 covers the valve opening 9 as well as a region on the base plate 3 situated in the longitudinal direction of the pressure relief valve. Said region is also referred to as channel zone 14. The channel zone 14 thereby has a length L1 and a width B2. The width of the base plate 3 is denoted with B1, wherein B1 is equal to L1 because said base plate is square. The channel zone 14 is thereby provided in the direction of a longitudinal extension of the valve opening 9 and completely covers said valve opening 9.

As can be seen in FIG. 3, the valve opening 9 is formed from two intersecting circular surfaces 10, 11. The centers M1 and M2 of the two circular surfaces 10, 11 thereby lie on a common axis X-X, which is also the center axis of the pressure relief valve 2. A first cavity apex 12 and a second cavity apex 13 are furthermore formed at the valve opening 9. The cavity apexes are thereby inwardly directed, wherein said cavity apexes 12, 13 are arranged in the longitudinal direction of the pressure relief valve in the middle of the same. The two circular surfaces 10, 11 have in each case the same radius R1 or R2. The surface area of the valve opening 9 is approximately 23.28 mm².

The surface area of the intermediate layer 6 is B2×L1=78.13 mm². The ratio V of the surface area of the intermediate layer to the surface area of the valve opening 9 is therefore:

$$V = 78.13 : 23.28 = 3.36.$$

The pressure relief valve 2 is thereby configured symmetrically about the central axis X-X as well as about another central axis perpendicular thereto. The reference numerals 7 and 8 thereby denote a first and a second spacer, which are adhesively bonded to the side of the membrane. The spacers 7, 8 ensure that the membrane 4 can arch in the region of the channel zone 14 when a positive pressure occurs in the interior of a packaging container.

Figure 1:
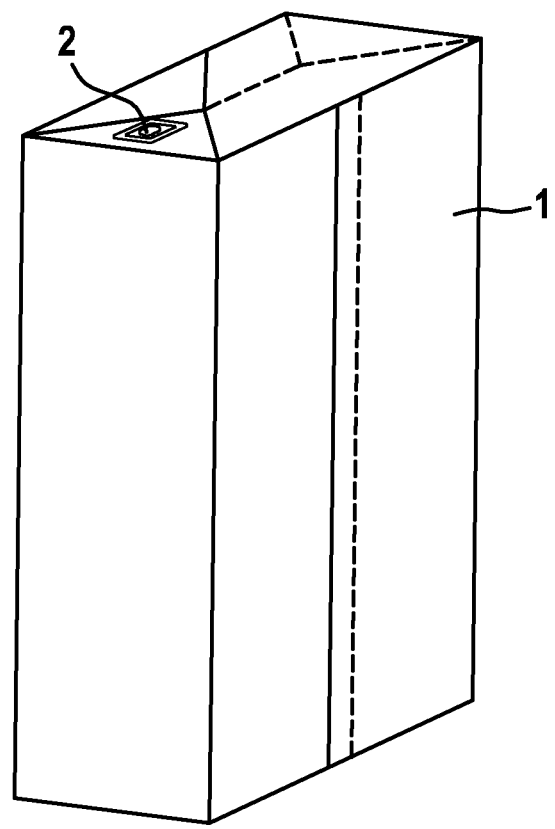
FIG. 1 shows a schematic, perspective view of a packaging container comprising a pressure relief valve according to a first exemplary embodiment of the invention.

FIG. 1 shows an exemplary application of the pressure relief valve 2 according to the invention, which in the case of a packaging container 1 is arranged at a base or head region and in the side gusset region of the head and the base. All lateral regions without regard to the pressure relief valve are available for printing, and therefore advertising and the like can correspondingly be printed thereupon.

It should be further noted that the intermediate layer 6 has a thickness D2, which is greater than a thickness D1 of the membrane 4. The stiffness of the membrane 4 and hence the opening behavior of the pressure relief valve 2 can be influenced by means of the selection of the thickness of the intermediate layer 6. The opening behavior of the pressure relief valve can thus be changed through a simple exchange of the intermediate layer 6 for an intermediate layer having another thickness. A modular construction can thereby be achieved in a simple manner, and a large number of identical parts are retained for different applications of pressure relief valves, wherein merely different intermediate layers 6 have to be available. Because the intermediate layers 6 can be simply applied to the adhesive coating of the membrane 4 by means of adhesive bonding, a simple and cost effective manufacturability of the pressure relief valve 2 can be achieved.

A miniaturization of the dimensions of the pressure relief valve 9 can further be achieved by the selection of the surface area ratios V between the surface area of the intermediate layer 6 and the surface area of the valve opening 9 without negatively affecting the opening behavior. A length L1 as well as a width B1 of the base plate 3 is 12.5 mm in this exemplary embodiment. The inventive pressure relief valve can thus be arranged inconspicuously at any desirable position on a packaging container.

Figure 4:
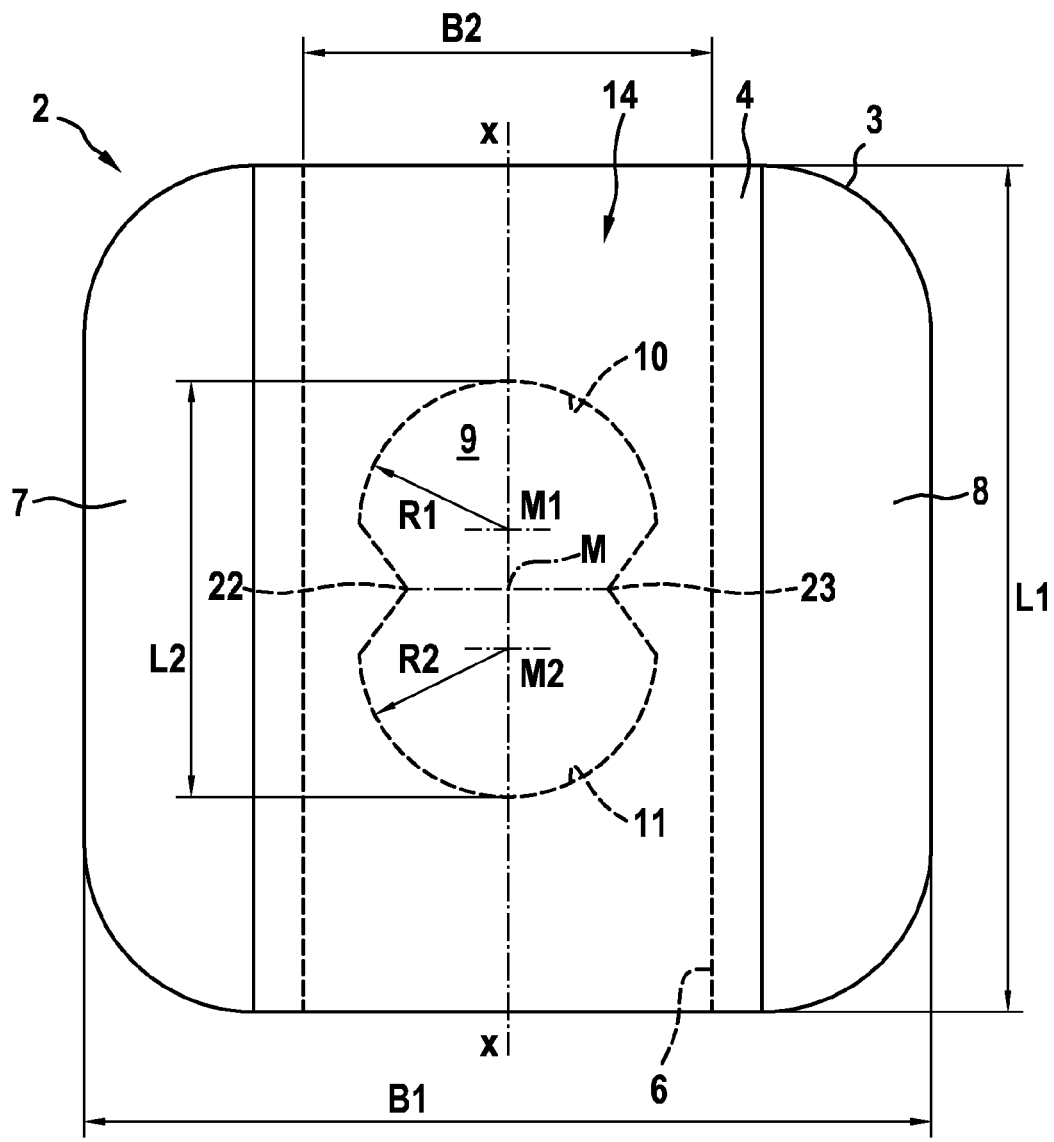
FIG. 4 shows a top view of the pressure relief valve according to a second exemplary embodiment of the invention.

A pressure relief valve pursuant to a second exemplary embodiment of the invention is described below in detail with reference to FIG. 4, wherein identical or functionally identical parts are denoted with the same reference numerals as in the first exemplary embodiment. In contrast to the first exemplary embodiment, the second exemplary embodiment comprises a first cavity apex 22 and a second cavity apex 23, which are formed differently than in the first exemplary embodiment. In the case of the second exemplary embodiment, the cavity apexes 22, 23 are configured in a triangular shape. In so doing, the cavity apexes extend further in the direction of a center M of the valve opening 9. A faster opening behavior of the pressure relief valve 2 is achieved by this change, i.e. the pressure relief valve 2 of the second exemplary embodiment already opens at a smaller positive pressure than that of the first exemplary embodiment. Otherwise this exemplary embodiment corresponds to the preceding exemplary embodiment, and therefore reference can be made to the description provided there.

Figure 5:
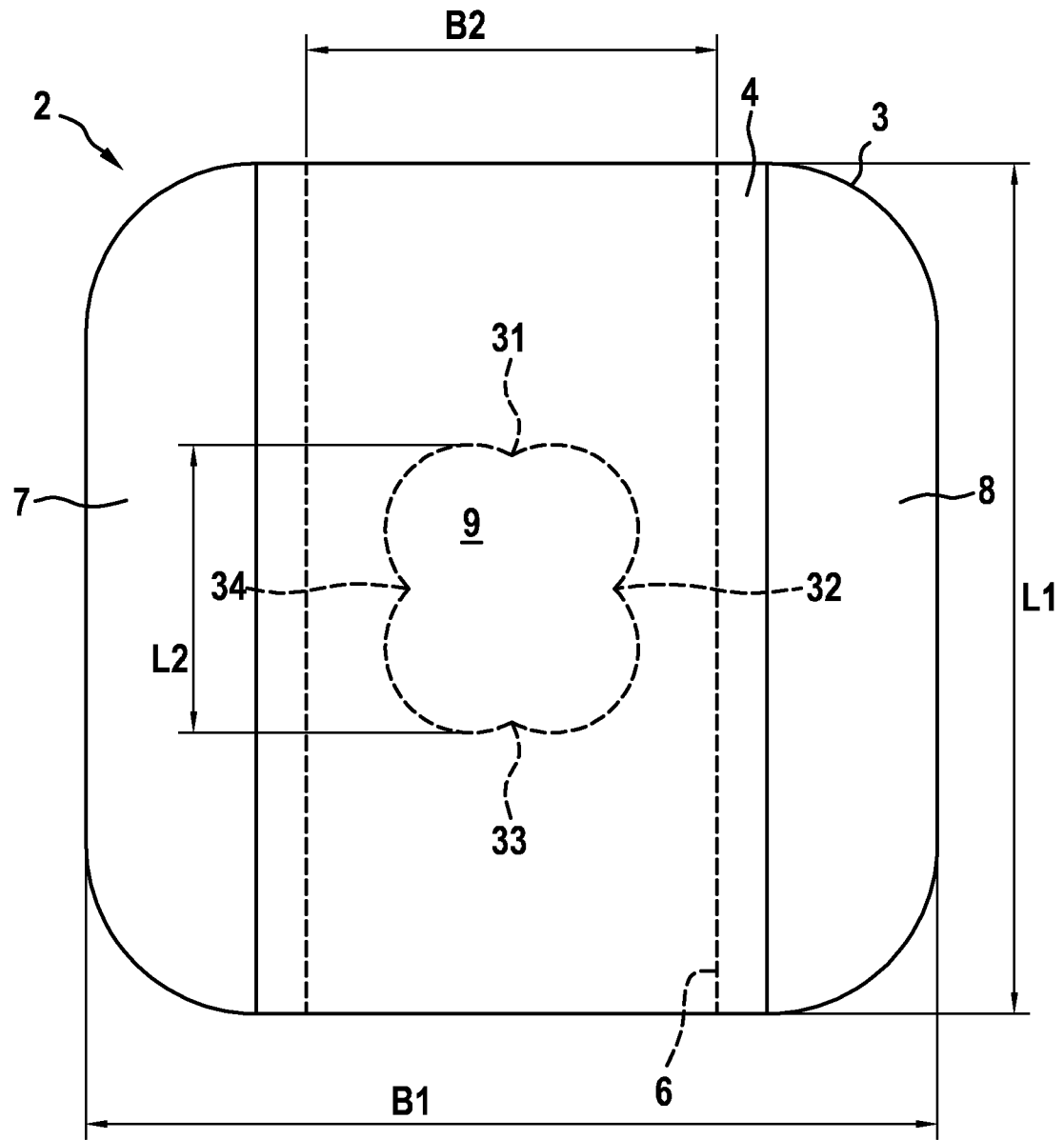
FIG. 5 shows a top view of a pressure relief valve according to a third exemplary embodiment of the invention.
Figure 6:
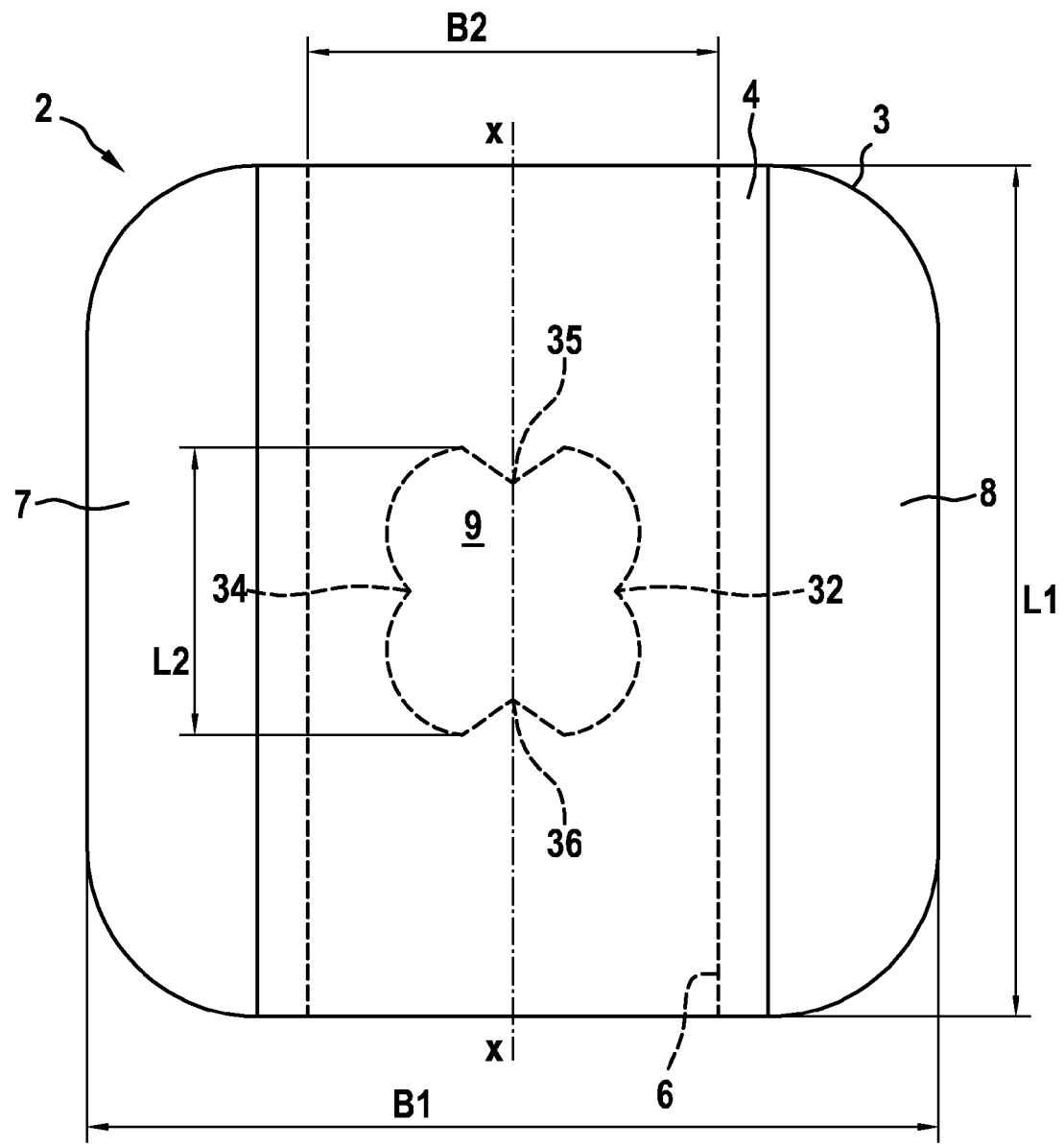
FIG. 6 shows a top view of the pressure relief valve according to a fourth exemplary embodiment of the invention.

FIGS. 5 and 6 depict a third and fourth exemplary embodiment of the invention. In this case, the valve opening 9 is formed from four intersecting circular surfaces. Four cavity apexes 31, 32, 33, 34 ensue as a result. The third exemplary embodiment of FIG. 5 thereby has cavity apexes which result from the intersecting circular surfaces. The fourth exemplary embodiment has in this connection two cavity apexes 35, 36 which have a triangular shape.

Figure 7:
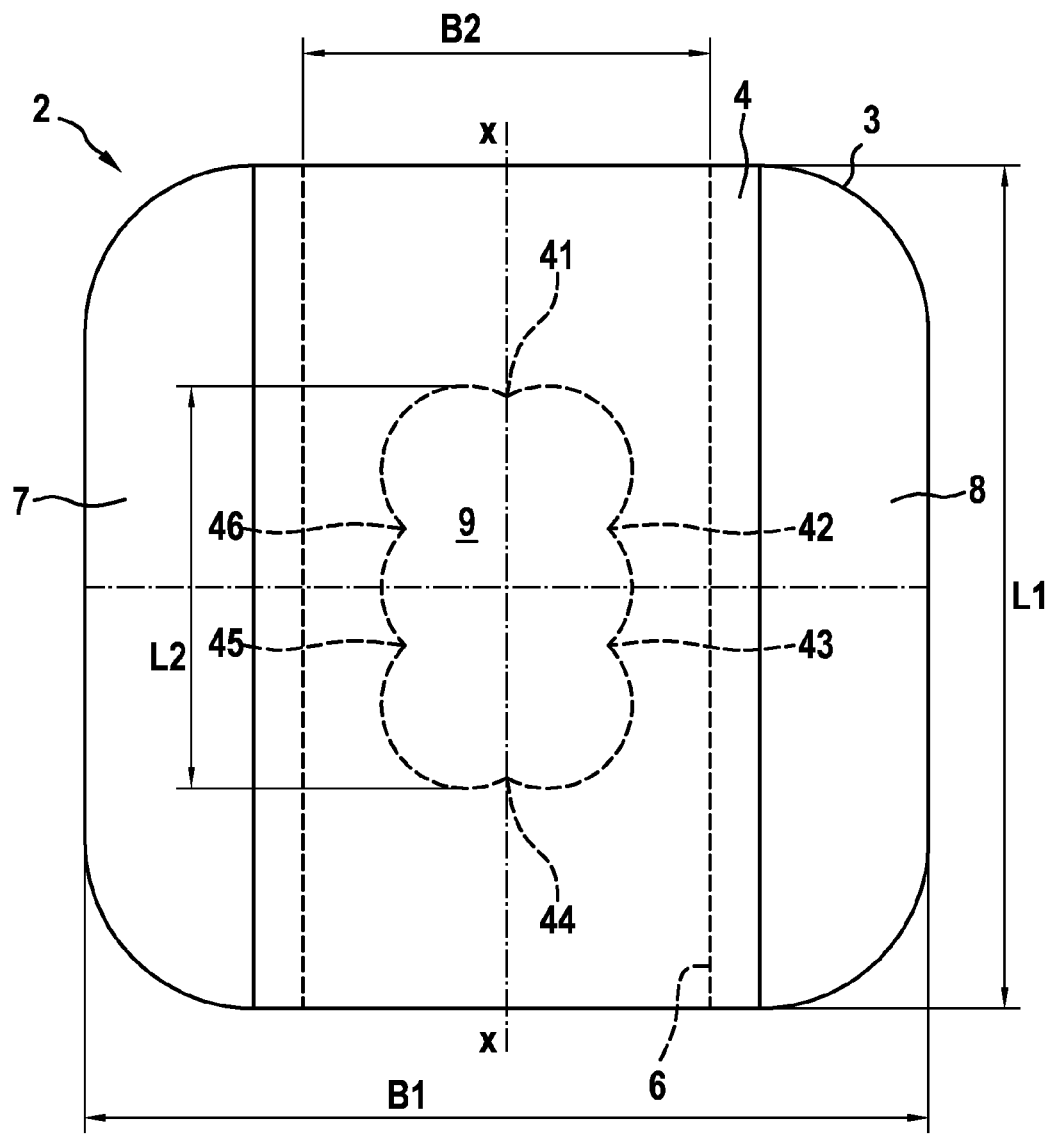
FIG. 7 shows a top view of the pressure relief valve according to a fifth exemplary embodiment of the invention.

FIG. 7 depicts a fifth exemplary embodiment of the invention, which comprises a valve opening 9 that is formed from six intersecting circular sections. Six cavity apexes 41, 42, 43, 44, 45, 46 thereby result. By means of these six inwardly directed cavity apexes of the valve opening 9, a very sensitive pressure relief valve 2 can be achieved, which opens already at small positive pressures of just a few pascals. Otherwise this exemplary embodiment corresponds to the preceding exemplary embodiments, and therefore reference can be made to the description provided there.

What is claimed is:

1. A pressure relief valve for a packaging container comprising:
   a base plate (3) configured to be fastened on a wall of the packaging container and has a valve opening (9),
   a membrane (4) which is arranged on the base plate (3) over the valve opening (9), wherein the membrane (4) has an adhesive on a side facing the base plate (3), and
   an intermediate layer (6) disposed between the base plate (3) and the membrane (4), the intermediate layer (6) adhesively bonded to the adhesive-containing side of the membrane such that the membrane (4) has two remaining, adhesive-containing peripheral zones on opposite sides of the intermediate layer (6) fastened on the base plate (3),
   wherein the intermediate layer (6) directly contacts the base plate and covers the valve opening (9) when a pressure inside the container is below a predetermined pressure, wherein the intermediate layer (6) has a thickness (D2) which is greater than a thickness (D1) of the membrane (4).

2. The pressure relief valve according to claim 1, wherein the intermediate layer (6) is adhesively bonded to a center of the membrane (4).

3. The pressure relief valve according to claim 1, wherein the intermediate layer (6) has a width (B2) which is approximately one half of a length (L1) of said intermediate layer (6).

4. The pressure relief valve according to claim 1, wherein a ratio (V) of a surface area of the intermediate layer (6) to a surface area of the valve opening (9) satisfies the equation $3 \leq V \leq 4$.

5. The pressure relief valve according to claim 1, wherein the valve opening (9) has a surface area which is equal to or less than 30 mm$^2$.

6. The pressure relief valve according to claim 1, wherein the valve opening is formed from two intersecting circular surfaces (10, 11).

7. The pressure relief valve according to claim 6, wherein a longitudinal extension (L2) of the valve opening (9) is equal to one half of a length (L1) of the base plate (3).

8. The pressure relief valve according to claim 1, wherein the valve opening (9) is formed from one of a group consisting of three, four, and six intersecting circular surfaces.

9. The pressure relief valve according to claim 6, wherein the valve opening (9) has cavity apexes (22, 23; 35, 36) which have a triangular shape.

10. The pressure relief valve according to claim 4, wherein V is approximately 3.5.

11. The pressure relief valve according to claim 1, wherein the valve opening (9) has a surface area which is less than or equal to 25 mm$^2$.

12. The pressure relief valve according to claim 1, wherein the valve opening is formed from two intersecting circular surfaces (10, 11) having the same radius (R1, R2).

13. The pressure relief valve according to claim 1, wherein the valve opening (9) is formed from three intersecting circular surfaces.

14. The pressure relief valve according to claim 1, wherein the valve opening (9) is formed from four intersecting circular surfaces.

15. The pressure relief valve according to claim 1, wherein the valve opening (9) is formed from six intersecting circular surfaces.

16. The pressure relief valve according to claim 1, wherein when the pressure inside the container is at or above the predetermined pressure, the membrane (4) arches in a channel zone (14) over the valve opening (9) and base plate (3) to allow pressure to be let out of the container.

17. The pressure relief valve according to claim 1, wherein the adhesive-containing peripheral zones are parallel adhesive-containing peripheral zones.

* * * * *